United States Patent
Gupta et al.

(10) Patent No.: US 8,417,868 B2
(45) Date of Patent: Apr. 9, 2013

(54) METHOD, APPARATUS AND SYSTEM FOR OFFLOADING ENCRYPTION ON PARTITIONED PLATFORMS

(75) Inventors: Ajay G. Gupta, Hillsboro, OR (US); Karanvir Grewal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 767 days.

(21) Appl. No.: 11/479,761

(22) Filed: Jun. 30, 2006

(65) Prior Publication Data
US 2008/0022094 A1 Jan. 24, 2008

(51) Int. Cl.
*G06F 12/00* (2006.01)
*G06F 12/06* (2006.01)
*H04L 29/06* (2006.01)
*G06F 11/00* (2006.01)
*G06F 12/14* (2006.01)
*G06F 12/16* (2006.01)

(52) U.S. Cl.
USPC ............ 711/2; 713/160; 713/164; 713/165; 726/22

(58) Field of Classification Search ............ 711/2, 100, 711/170, 173; 713/150, 164, 165
See application file for complete search history.

(56) References Cited

U.S. PATENT DOCUMENTS

| | | | |
|---|---|---|---|
| 6,693,878 B1 * | 2/2004 | Daruwalla et al. ............ 370/235 |
| 2003/0005328 A1 | 1/2003 | Grewal et al. |
| 2004/0103278 A1 * | 5/2004 | Abhishek et al. ............ 713/160 |
| 2004/0242228 A1 * | 12/2004 | Lee et al. ............ 455/432.1 |
| 2005/0086510 A1 * | 4/2005 | Nicodemus et al. .......... 713/200 |
| 2005/0091486 A1 * | 4/2005 | Avraham et al. ............ 713/162 |
| 2005/0160290 A1 * | 7/2005 | Moon et al. ............ 713/201 |
| 2005/0223111 A1 * | 10/2005 | Bhandaru et al. ............ 709/236 |
| 2006/0070066 A1 * | 3/2006 | Grobman ............ 718/1 |
| 2007/0006175 A1 * | 1/2007 | Durham et al. ............ 717/131 |
| 2007/0064661 A1 * | 3/2007 | Sood et al. ............ 370/338 |
| 2007/0110245 A1 * | 5/2007 | Sood et al. ............ 380/270 |
| 2007/0168399 A1 * | 7/2007 | Schultz et al. ............ 707/201 |

OTHER PUBLICATIONS

Kapil Sood et al., "Method, Apparatus and System for Protecting Security Keys on a Wireless Platform", U.S. Appl. No. 11/281,982, filed Nov. 16, 2005.

* cited by examiner

*Primary Examiner* — Yin-Chen Shaw
*Assistant Examiner* — Jahangir Kabir
(74) *Attorney, Agent, or Firm* — Garrett IP, LLC

(57) ABSTRACT

A method, apparatus and system enable offloading of encryption on partitioned platforms. More specifically, a partitioned platform may include a user partition for user applications, including a Virtual Private Network ("VPN") application capable to creating a VPN connection for secure packet transmission. The partitioned platform may additionally comprise a dedicated partition including security agents to examine packets transmitted to/received by the dedicated partition. The dedicated partition may be assigned the Network Interface Card ("NIC") on the host, i.e., all network traffic coming into or leaving the platform may be routed via the dedicated partition. In one embodiment of the invention, a driver in the user partition may offload cryptographic tasks to the dedicated partition, where clear packets may be examined by security agents, then encrypted prior to transmission.

17 Claims, 5 Drawing Sheets

HOST 200

METHOD, APPARATUS AND SYSTEM FOR OFFLOADING ENCRYPTION ON PARTITIONED PLATFORMS

BACKGROUND

Various security threats such as viruses, worms and other malicious programs ("malware") may attack the operating systems ("OSes") on mobile and desktop devices (hereafter collectively "hosts"). The hosts typically employ various security agents (e.g., virus scanners) and other security schemes such as firewalls and/or gateways to protect the host's OS. As malware becomes more sophisticated, however, these agents and security schemes themselves have become vulnerable to exploits and attacks from the malware executing on the host.

By way of example, in the case of remote access (e.g., via a wireless device or other remote hosts) to an enterprise server, a typical security scheme may utilize a Virtual Private Networking ("VPN"), as illustrated in FIG. 1. Specifically, as illustrated, according to a VPN security scheme, a VPN gateway ("VPN Gateway 100") may be implemented to protect a corporate network or intranet ("Corporate Network 105") from an external network ("External Network 110"). A remote client ("Client 115") may connect securely to Server 120 from External Network 110 via VPN Gateway 100, which may encrypt the packets between Client 100 and VPN Gateway, 100 (using an IP Security ("IPSec") protocol or other such security protocol). Leveraging security protocols such as IPsec on the host renders the data packets opaque to any security agents residing on the host, as these security agents may typically reside logically below the encryption engines in partitioned environments. These security agents may take the form of anti-virus agents, deep packet inspection for intrusion detection or a simple host resident firewall.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a method, apparatus and system for offloading encryption on partitioned platforms. Reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

The concept of "dedicated partitions" on platforms has emerged, in part, in response to the malware concerns described above. Specifically, by segregating the security agents within dedicated partitions on platforms, these platform models may handle security and/or platform management functions in an isolated partition, which largely avoids the risks inherent in non-partitioned platforms. These dedicated partitions may comprise a variety of different types of partitions, including an entirely separate hardware partition (e.g., utilizing Intel® Corporation's Active Management Technologies ("AMT"), "Manageability Engine" ("ME"), Platform Resource Layer ("PRL") and/or other comparable or similar technologies) and/or a virtualized partition (e.g., a virtual machine in Intel® Corporation's Virtualization Technology ("VT") scheme). It will be apparent to those of ordinary skill in the art that a virtualized host may also be used to interact with and/or leverage services provided by AMT, ME and PRL technologies (as described in further detail below).

Figure 1:
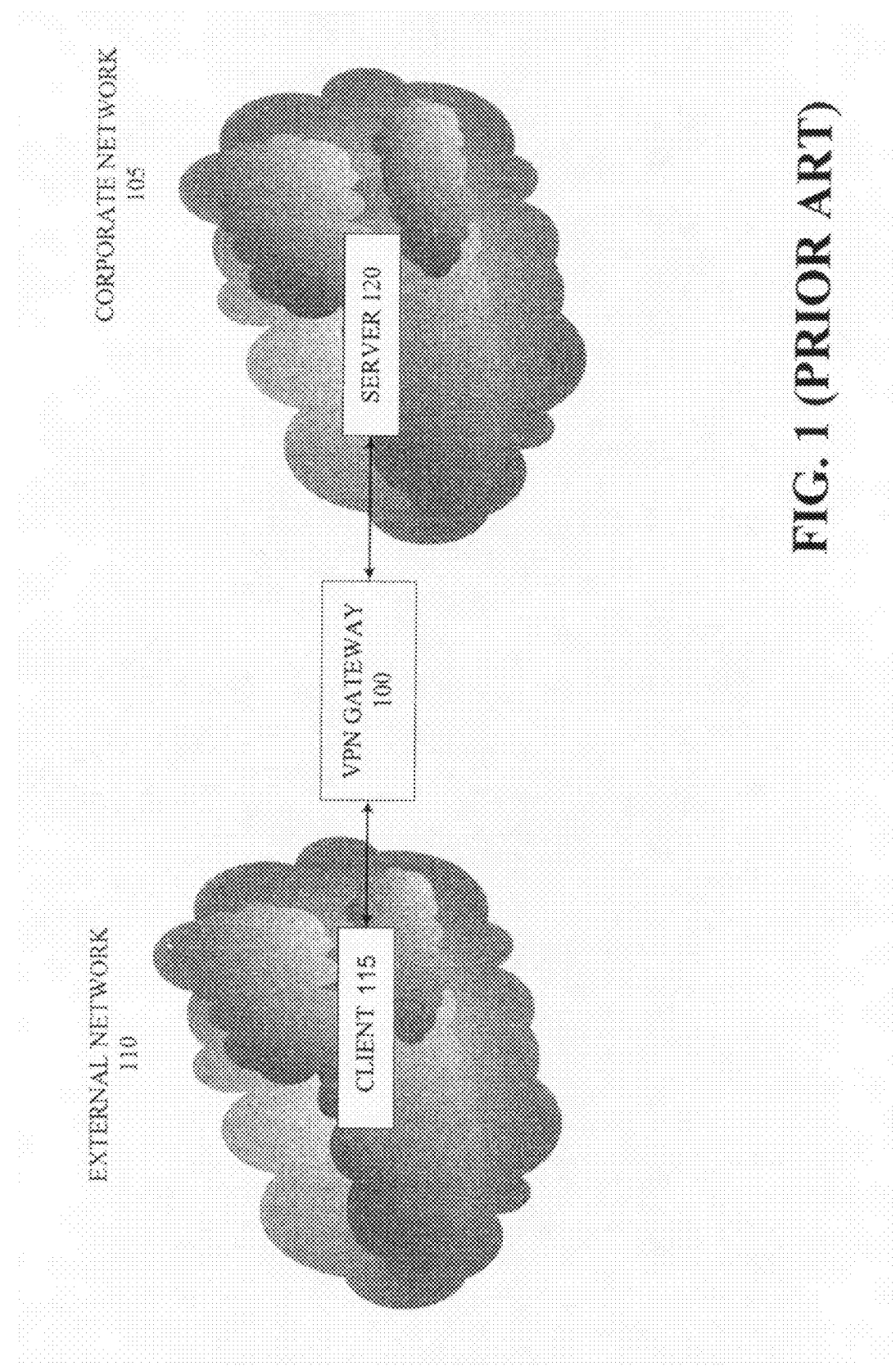
FIG. 1 illustrates a typical virtual private network ("VPN") security scheme.
Figure 2:
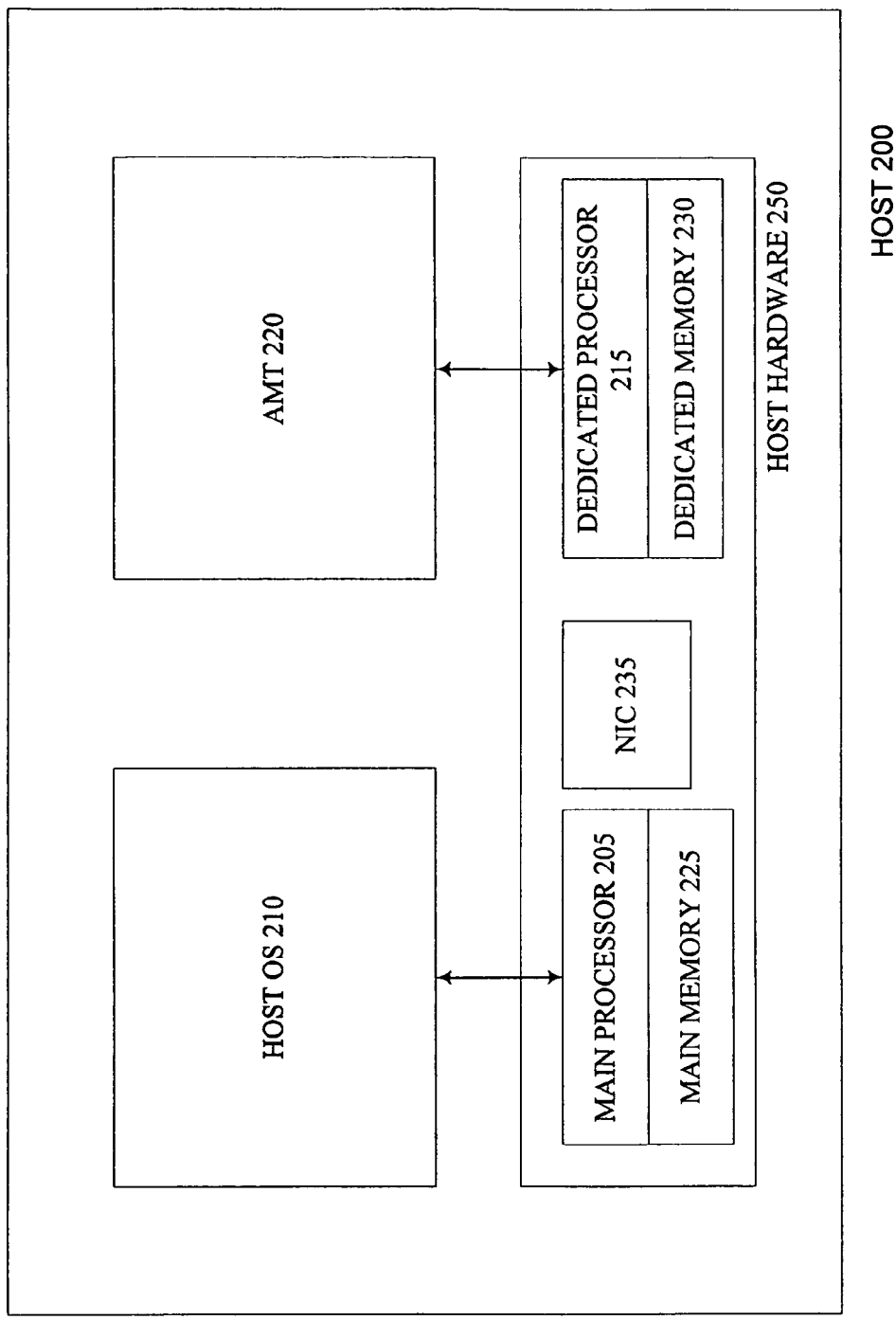
FIG. 2 illustrates an example AMT environment.

By way of example, FIG. 2 illustrates conceptually a typical Intel® AMT environment as implemented by Intel® Corporation. It will be readily apparent to those of ordinary skill in the art that embodiments of the present invention may also be implemented in other similar and/or comparable implementations of AMT. Only the components pertinent to describing the AMT environment have been illustrated in order not to unnecessarily obscure embodiments of the present invention, but it will be readily apparent to those of ordinary skill in the art that additional components may be included without departing from the spirit of embodiments of the invention.

Thus, as illustrated in FIG. 2, a device ("Host 200") may include a host operating system ("Host OS 210") and system hardware ("Hardware 250"). According to one embodiment, Hardware 250 may include one, two or more processors, one or more to perform typical processing tasks for Host OS 210 ("Main Processor 205") while the other may be dedicated exclusively to managing the device via a dedicated partition ("Dedicated Processor 215" for "AMT 220"). Each processor may have associated resources on Host 200 and they may share one or more other resources. Thus, as illustrated in this example, Main Processor 205 and Dedicated Processor 210 may each have portions of memory dedicated to them ("Main Memory 225" and "Dedicated Memory 230" respectively) but they may share a network interface card ("NIC 235").

Figure 3:
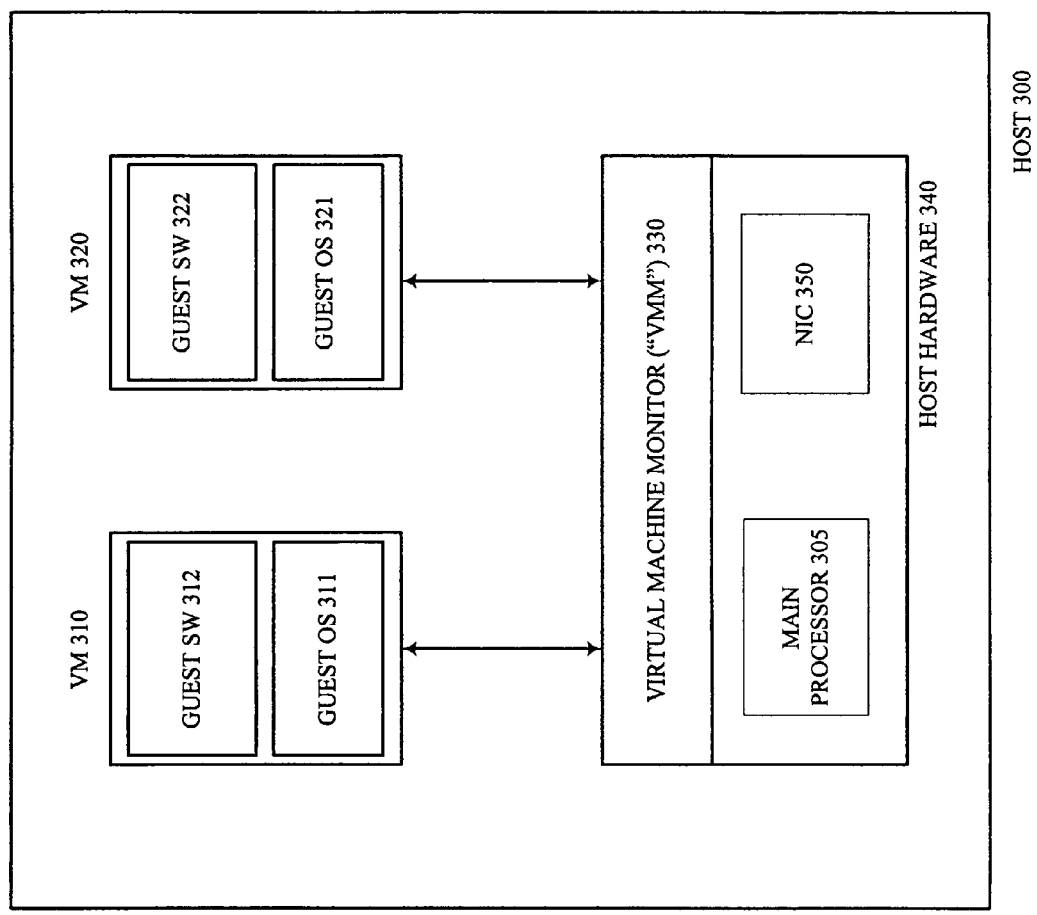
FIG. 3 illustrates an example virtual machine host.

Similarly, as illustrated in FIG. 3, if device ("Host 300") is virtualized, it may include only a single processor but a virtual machine monitor ("VMM 330") on the device may present multiple abstractions and/or views of the device or host, such that the underlying hardware of the host appears as one or more independently operating virtual machines ("VMs"). VMM 330 may be implemented in software (e.g., as a standalone program and/or a component of a host operating system), hardware, firmware and/or any combination thereof. VMM 330 manages allocation of resources on the host and performs context switching as necessary to cycle between various VMs according to a round-robin or other predetermined scheme. It will be readily apparent to those of ordinary skill in the art that although only one processor is illustrated ("Main Processor 305"), embodiments of the present invention are not so limited and multiple processors or processor cores may also be utilized within a virtualized environment.

Although only two VM partitions are illustrated ("VM 310" and "VM 320", hereafter referred to collectively as "VMs"), these VMs are merely illustrative and additional virtual machines may be added to the host. VM 310 and VM 320 may function as self-contained platforms respectively, running their own "guest operating systems" (i.e., operating systems hosted by VMM 330, illustrated as "Guest OS 311" and "Guest OS 321" and hereafter referred to collectively as "Guest OS") and other software (illustrated as "Guest Software 312" and "Guest Software 322" and hereafter referred to collectively as "Guest Software").

Each Guest OS and/or Guest Software operates as if it were running on a dedicated computer rather than a virtual machine. That is, each Guest OS and/or Guest Software may expect to control various events and have access to hardware resources on Host 100. Within each VM, the Guest OS and/or Guest Software may behave as if they were, in effect, running on Host 300's physical hardware ("Host Hardware 340", which may include a Network Interface Card ("NIC 350")).

It will be readily apparent to those of ordinary skill in the art that an AMT, ME or PRL scheme may also be implemented within a virtualized environment. For example, VM 320 may be dedicated as an AMT partition on a host while VM 310 runs user applications on the host. In this scenario, the host may or may not include multiple processors. If the host does include two processors, for example, VM 320 may be assigned Dedicated Processor 215 while VM 310 (and other VMs on the host) may share the resources of Main Processor 205. On the other hand, if the host includes only a single processor, the processor may serve both the VMs, but VM 320 may still be isolated from the other VMs on the host with the cooperation of VMM 330. For the purposes of simplicity, embodiments of the invention are described in a virtualized environment, but embodiments of the invention are not so limited. Instead, any reference to a "partition", a secure partition", a "security partition" and/or a "management partition" shall include any physical and/or virtual partition (as described above).

As previously discussed, by segregating security agents within a dedicated partition on a partitioned platform, the dedicated partition may handle security and/or platform management functions while avoiding the risks inherent in non-partitioned platforms. This dedicated partition may comprise a virtualized partition or a hardware partition without departing from embodiments of the present invention. More specifically, the NIC and NIC resources, the networking stack and/or virus scanners and networking firewall services may reside in a dedicated partition (hereafter "Service Partition") of a partitioned host, and various applications, including networking stacks and the main operating systems for platform users may be contained within a separate partition (hereafter "Capability Partition"). In this scenario, the Capability Partition does not have direct access to the Service Partition, thus isolating the Service Partition for security and administrative applications. All network traffic coming into or leaving the host may be routed via the Service Partition (since the Service Partition "owns" the NIC resources) and as such, the Service Partition may examine all packets coming into or leaving the host. By inspecting all traffic coming into and existing the host, the Service Partition may provide a secure first line of defense for the platform from network-based attacks waged to/from the platform.

This security services provided by the Service Partition may be hindered, however, if a security protected tunnel (e.g. VPN) is originated from one of the Capability Partitions. As previously discussed, VPN security schemes provide administrators with a mechanism for securing the network traffic by leveraging cryptographic techniques such as encryption. If a VPN tunnel originates from a Capability Partition, all packets entering the Service Partition to and from the Capability Partition may be encapsulated/encrypted. In other words, although packets from the Capability Partition may be routed via the Service Partition, as previously described, the Service Partition may not be able to examine encrypted packets. As a result, the Service Partition may not be able to provide the previously-discussed first line of defense against network-based attacks.

Embodiments of the present invention include a method, apparatus and system to enable secure VPN architectures on partitioned platforms. More specifically, according to an embodiment of the present invention, encryption of network traffic may be "offloaded" from a Capability Partition to a Security Partition, which may, in one embodiment, further offload the encryption tasks to hardware. By ensuring that the Capability Partition does not encrypt/decrypt packets, embodiments of the invention enable the Security Partition to examine the clear (unencrypted) network packets originating from and directed to the Capability Partition, while still enabling cryptographic techniques to be used on the packets after the packets have been examined.

The following paragraphs describe this "offload" scheme in further detail. All references herein to VPNs or security tunnels shall include IPSec-based VPNs, but embodiments of the present invention are not so limited. Instead, other existing security schemes (e.g., SSL/TLS and/or proprietary VPNs) or newly developed security schemes may also be utilized without departing from the spirit of embodiments of the present invention. VPN gateways and IPSec are well known to those of ordinary skill in the art and further description thereof is omitted herein in order not to unnecessarily obscure embodiments of the present invention.

In one embodiment of the invention, an "IPSec offload" feature may be utilized to offload the encryption from one partition to another. More specifically, it is well known to those of ordinary skill in the art that the Microsoft® Windows Network Driver Interface Specification ("NDIS") defines an offload approach, whereby an IPSec client may offload encryption/decryption to an Ethernet NIC driver. It is also well known that there is a standard interface defined by Microsoft® Windows NDIS whereby a VPN client may offload encryption/decryption handling to either a NIC or the NIC driver. In either situation, the encryption may be performed by the NIC driver and/or on the NIC. Typically, most WLAN device drivers do not support this IPSec offload feature because of the bandwidth limitations of wireless protocols (i.e., the encryption may be easily handled higher in the stack at line rates).

Figure 4:
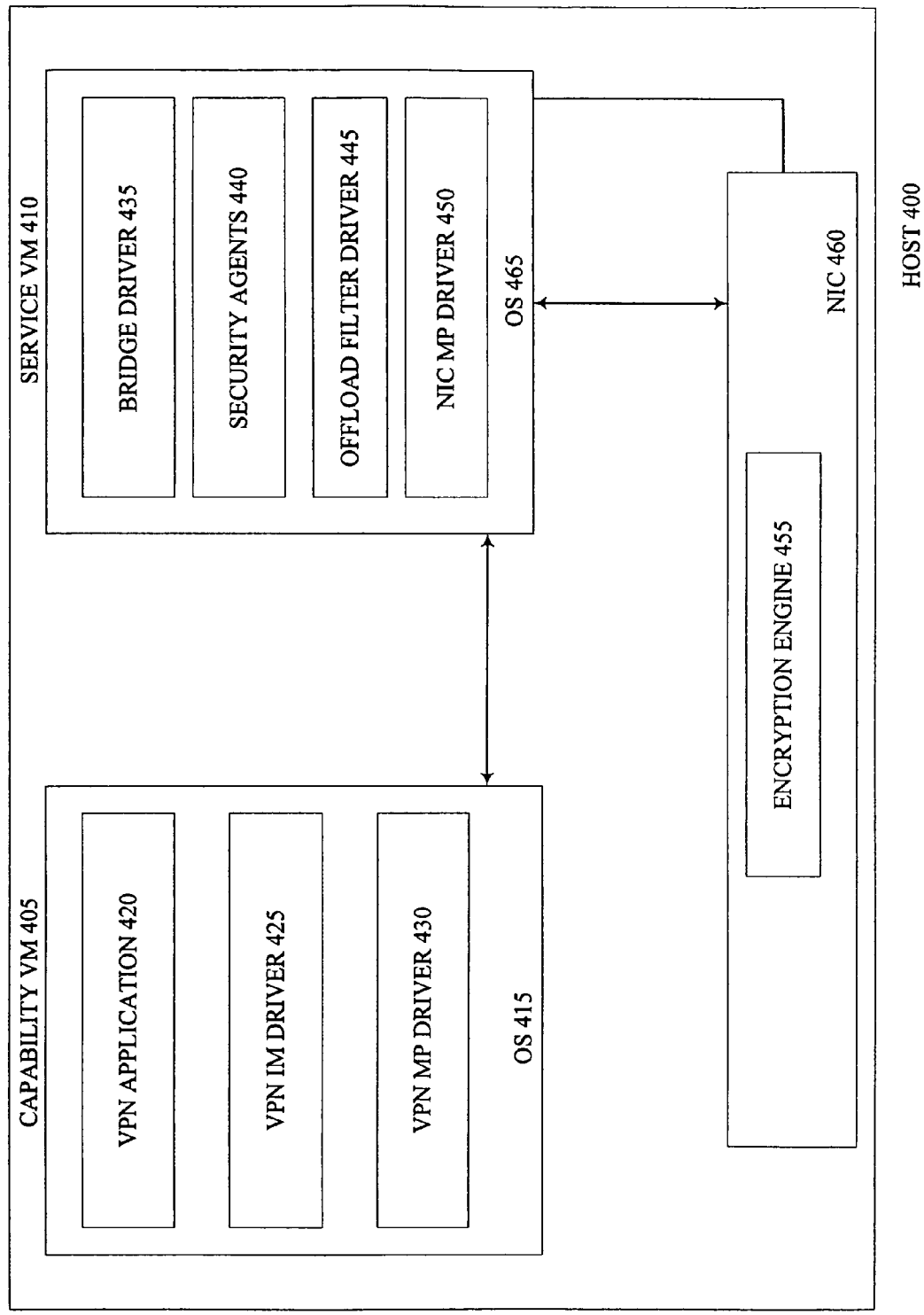
FIG. 4 illustrates conceptually the components of an embodiment of the present invention.

Embodiments of the present invention enable a seamless solution for secure VPN tunneling on partitioned platforms regardless of whether the WLAN driver on the platform supports this feature. FIG. 4 illustrates an embodiment of the present invention. In the illustrated example, Host 400 is a virtualized host having multiple VMs, namely a Capability VM ("Capability VM 405") and a Service VM ("Service VM 410"). Capability VM 405 may include a VPN client application ("VPN Client Application 420"), as well as various VPN drivers ("VPN IM Driver 425" and VPN MP Driver 430"), running on OS 415. The various VPN drivers (e.g., VPN intermediate and/or VPN miniport drivers) are well known to those of ordinary skill in the art and further description thereof is omitted herein in order not to unnecessarily obscure embodiments of the invention. Service VM 410 may include a bridge driver ("Bridge Driver 435"), security agents (e.g., virus scanners, firewalls, etc., illustrated collectively as "Security Agents 440"), a filter driver supporting IPSec offload ("IPSec Offload Filter Driver 445") and a WLAN device driver (e.g., NIC MP Driver 450"), running on OS 465.

In one embodiment, packet encryption/decryption that is typically performed in Capability VM 405 may be offloaded to the Service VM 410. As previously described, however, most WLAN device drivers do not support IPSec offload capabilities. According to an embodiment of the invention, in order to enable this offload feature, an IPSec Offload Filter Driver 445 in Service VM 410 may "expose" IPSec offload capabilities to the VPN drivers in Capability VM 405. It will be apparent to those of ordinary skill in the art that this advertising may occur in a variety of ways without departing from the spirit of embodiments of the present invention. Thus, for example, in one embodiment, the VPN drivers in Capability VM 405 (i.e., VPN Drivers 425 and/or 430) may query the capabilities of the NIC driver using NDIS defined "oids". IPSec Offload Filter Driver 445 may intercept this query and respond with the fact that it supports cryptographic capabilities. In other words, IPSec Offload Filter Driver 445 may advertise IPSec offload capabilities, regardless of whether the WLAN device driver in fact supports this feature.

As a result, VPN IM Driver 425 and/or VPN MP Driver 430 may offload the cryptographic operations of IPSec to Service VM 410, i.e., VPN IM Driver 425 and/or VPN MP Driver 430 may transmit and receive unencrypted packets to and from Bridge Driver 435. More specifically, when clear packets are transmitted to Bridge Driver 435, the VPN drivers may mark that the packets need to be encrypted and include in the packets the metadata that describes which key to use during encryption. The clear packets may be examined by Security Agents 440 and thereafter, IPSec Offload Filter Driver 445 may utilize the metadata key contained within the clear packets to find the appropriate key and perform encryption. In one embodiment, the encryption may be performed by a cryptographic encryption engine ("Encryption Engine 455"), NIC MP Driver 450 or alternatively, by NIC 460, if NIC 460 in fact supports encryption/decryption. This process may be reversed upon receipt of an encrypted packet destined for Capability Partition 405.

Figure 5:
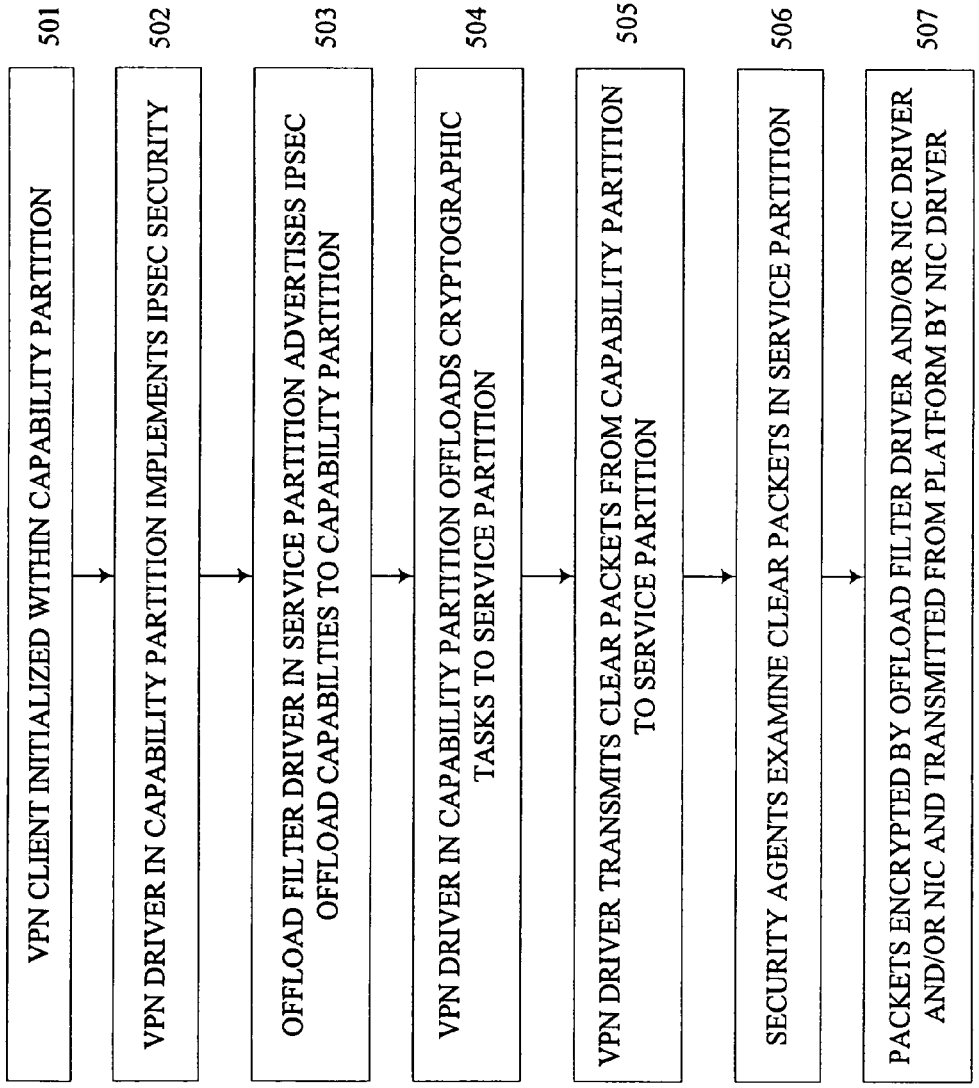
FIG. 5 is a flow chart illustrating an embodiment of the present invention.

FIG. 5 is a flow chart illustrating an embodiment of the present invention. Although the following operations may be described as a sequential process, many of the operations may in fact be performed in parallel and/or concurrently. In addition, the order of the operations may be re-arranged without departing from the spirit of embodiments of the invention. In 501, a VPN client application may be initialized within a capability partition on a partitioned platform and a VPN driver in the capability partition may implement the IPSec protocol in 502. In 503, an offload filter driver in the service partition may advertise its IPSec offload capabilities to the capability partition in 504, the VPN driver may offload cryptographic functionality to the service partition and transmit clear packets to a bridge driver in the service partition IN 505. Security agents in the service partition may thereafter examine the clear packets in 506 and in 507, the packets may be encrypted by the offload driver and/or the NIC device driver and/or the NIC, and transmitted from the platform by the NIC driver.

The hosts according to embodiments of the present invention may be implemented on a variety of computing devices. According to an embodiment, a computing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including PCI, PCI Express, FireWire and other such existing and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
    advertising cryptographic offload capabilities on a partitioned platform having at least a dedicated partition and a user partition, wherein the advertising is performed by an offload driver in the dedicated partition;
    offloading cryptographic tasks from the user partition to the offload driver in the dedicated partition;
    transmitting unencrypted outgoing packets from the user partition to the dedicated partition;
    performing encryption on the unencrypted outgoing packets to generate outgoing encrypted packets;
    transmitting the outgoing encrypted packets from the dedicated partition on the partitioned platform to a remote recipient;
    receiving incoming encrypted packets in the dedicated partition on the partitioned platform from a remote sender;
    performing decryption on the incoming encrypted packets to generate unencrypted incoming packets; and
    transmitting the unencrypted incoming packets from the dedicated partition to the user partition,
    wherein said advertising comprises, in response to a query from a virtual private network (VPN) driver in the user partition as to available capabilities of a network interface card driver, intercepting the query and, if the offload driver is capable of supporting cryptographic operations, indicating to the user partition that the offload driver is capable of supporting the cryptographic operations.

2. The method according to claim 1 wherein advertising cryptographic offload capabilities further comprises advertising IPSec offload capabilities by an IPSec offload driver in the dedicated partition.

3. The method according to claim 2 wherein advertising the IPSec offload capabilities by the IPSec offload driver in the dedicated partition further comprises advertising IPSec offload capabilities regardless of whether the network interface card ("NIC") on the partitioned platform supports the IPSec offload capabilities.

4. The method according to claim 1 wherein the partitioned platform is a virtualized platform.

5. The method according to claim 1 wherein the dedicated partition is one of an Active Management Technologies ("AMT") partition, a Manageability Engine ("ME") partition, a partition on a Platform Resource Layer ("PRL") platform and a virtual machine ("VM").

6. The method according to claim 1 wherein the dedicated partition and the user partition are logical partitions on the partitioned platform.

7. The method according to claim 1 wherein the dedicated partition and the user partition are physical partitions on the partitioned platform.

8. A system comprising:
a user partition on a partitioned platform; and
a dedicated partition on the partitioned platform, the dedicated partition coupled to the user partition, the dedicated partition comprising an offload driver capable of advertising cryptographic offload capabilities, and the user partition capable of offloading cryptographic tasks from the user partition to the offload driver of the dedicated partition,
wherein the user partition is configured to transmit unencrypted outgoing packets to the dedicated partition, and the dedicated partition is configured to perform encryption on the unencrypted outgoing packets to generate outgoing encrypted packets, transmit the outgoing encrypted packets from the dedicated partition on the partitioned platform to a remote recipient, receive incoming encrypted packets in the dedicated partition on the partitioned platform from a remote sender, perform decryption on the incoming encrypted packets to generate unencrypted incoming packets, and transmit the unencrypted incoming packets to the user partition, and
wherein the advertising comprises, in response to a query from a virtual private network (VPN) driver in the user partition as to available capabilities of a network interface card driver, intercepting the query and, if the offload driver is capable of supporting cryptographic operations, indicating to the user partition that the offload driver is capable of supporting the cryptographic operations.

9. The system according to claim 8 further comprising an IPSec offload driver in the dedicated partition, the IPSec offload driver capable of advertising cryptographic offload capabilities by advertising IPSec offload capabilities.

10. The system according to claim 9, wherein the IPSec offload driver in the dedicated partition is capable of advertising the IPSec offload capabilities regardless of whether the NIC supports the IPSec offload capabilities.

11. The system according to claim 8 wherein the partitioned platform is a virtualized platform.

12. The system according to claim 8 wherein the dedicated partition is one of an Active Management Technologies ("AMT") partition, a Manageability Engine ("ME") partition, a partition on a Platform Resource Layer ("PRL") platform and a virtual machine ("VM").

13. The system according to claim 8 wherein the dedicated partition and the user partition are logical partitions on the partitioned platform.

14. The system according to claim 8 wherein the dedicated partition and the user partition are physical partitions on the partitioned platform.

15. An article comprising a non-transitory machine-accessible medium having stored thereon instructions that, when executed by a machine, cause the machine to:
advertise cryptographic offload capabilities for a partitioned platform on the machine, the partitioned platform having at least a dedicated partition and a user partition, wherein the advertising is performed by an offload driver in the dedicated partition;
offload cryptographic tasks from the user partition to the offload driver in the dedicated partition,
transmit unencrypted outgoing packets from the user partition to the dedicated partition;
perform encryption on the unencrypted outgoing packets to generate outgoing encrypted packets;
transmit the outgoing encrypted packets from the dedicated partition on the partitioned platform to a remote recipient;
receive incoming encrypted packets in the dedicated partition on the partitioned platform from a remote sender;
perform decryption on the incoming encrypted packets to generate unencrypted incoming packets; and
transmit the unencrypted incoming packets from the dedicated partition to the user partition,
wherein the advertising comprises, in response to a query from a virtual private network (VPN) driver in the user partition as to available capabilities of a network interface card driver, intercepting the query and, if the offload driver is capable of supporting cryptographic operations, indicating to the user partition that the offload driver is capable of supporting the cryptographic operations.

16. The article according to claim 15 wherein the instructions, when executed by the machine, further cause the machine to advertise the cryptographic offload capabilities by advertising IPSec offload capabilities by an IPSec offload driver in the dedicated partition.

17. The article according to claim 16 wherein the instructions, when executed by the machine, further cause the machine to advertise the IPSec offload capabilities regardless of whether the network interface card ("NIC") on the partitioned platform supports the IPSec offload capabilities.

* * * * *